United States Patent
Kim et al.

(10) Patent No.: US 9,869,896 B2
(45) Date of Patent: Jan. 16, 2018

(54) DISPLAY DEVICE, COLOR CONVERSION FILM, AND MANUFACTURING METHOD THEREOF

(71) Applicant: SAMSUNG DISPLAY CO., LTD., Yongin, Gyeonggi-Do (KR)

(72) Inventors: Dong-Uk Kim, Hwaseong-si (KR); Young Min Kim, Yongin-si (KR); Hae IL Park, Seoul (KR); Mun-Ki Sim, Seoul (KR); Kwang Keun Lee, Osan-si (KR); Hyun Min Cho, Seoul (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 0 days.

(21) Appl. No.: 14/733,162

(22) Filed: Jun. 8, 2015

(65) Prior Publication Data

US 2016/0178960 A1 Jun. 23, 2016

(30) Foreign Application Priority Data

Dec. 22, 2014 (KR) ........................ 10-2014-0186577

(51) Int. Cl.
*F21V 9/00* (2015.01)
*G02F 1/1335* (2006.01)
*F21V 9/16* (2006.01)
*F21V 13/08* (2006.01)

(52) U.S. Cl.
CPC .. *G02F 1/133514* (2013.01); *G02F 1/133617* (2013.01); *F21V 9/16* (2013.01); *F21V 13/08* (2013.01); *G02F 1/133512* (2013.01); *G02F 2001/133614* (2013.01); *G02F 2202/36* (2013.01)

(58) Field of Classification Search
CPC ......... G02F 1/133514; G02F 1/133512; G02F 1/133617; G02F 2001/133614; G02F 2202/36; F21V 9/16; F21V 13/08
See application file for complete search history.

(56) References Cited

U.S. PATENT DOCUMENTS

| | | | | |
|---|---|---|---|---|
| 2003/0189829 A1* | 10/2003 | Shimizu et al. | .......... | F21L 4/00 362/240 |
| 2008/0305427 A1* | 12/2008 | Sanada et al. | ........ | B41C 1/1041 430/270.1 |
| 2009/0009050 A1* | 1/2009 | Kanade et al. | ........... | F21V 9/16 313/483 |
| 2012/0032151 A1* | 2/2012 | Hama et al. | ........... | G02B 5/223 257/40 |
| 2014/0192294 A1* | 7/2014 | Chen et al. | ................ | F21V 9/08 362/293 |
| 2015/0055319 A1* | 2/2015 | Zink et al. | ............ | H01L 33/505 362/84 |

(Continued)

FOREIGN PATENT DOCUMENTS

JP 10186345 A * 7/1998
KR 10-2001-0060824 A 7/2001

(Continued)

*Primary Examiner* — Y M. Lee
(74) *Attorney, Agent, or Firm* — Lee & Morse, P.C.

(57) ABSTRACT

A display device, including a color conversion film, including a base film including a plurality of openings, the base film blocking light, and a color conversion layer in the openings, the color conversion layer including a pattern of different colors.

12 Claims, 26 Drawing Sheets

(56) References Cited

U.S. PATENT DOCUMENTS

| | | | |
|---|---|---|---|
| 2015/0077966 A1* | 3/2015 | Bessho et al. | G02B 5/0242 362/84 |
| 2015/0184808 A1* | 7/2015 | Wang et al. | F21K 9/30 362/235 |

FOREIGN PATENT DOCUMENTS

| | | |
|---|---|---|
| KR | 10-2005-0076663 A | 7/2005 |
| KR | 10-0662784 B1 | 12/2006 |
| KR | 10-2010-0002068 A | 1/2010 |
| KR | 10-2010-0024083 A | 3/2010 |
| KR | 10-2012-0131108 A | 12/2012 |

* cited by examiner

DISPLAY DEVICE, COLOR CONVERSION FILM, AND MANUFACTURING METHOD THEREOF

CROSS-REFERENCE TO RELATED APPLICATION

Korean Patent Application No. 10-2014-0186577, filed on Dec. 22, 2014, in the Korean Intellectual Property Office, and entitled: "Display Device, Color Conversion Film, and Manufacturing Method Thereof," is incorporated by reference herein in its entirety.

BACKGROUND

1. Field

Provided are a display device, a color conversion film, and a manufacturing method thereof.

2. Description of the Related Art

Display devices such as a liquid crystal display device and an organic light emitting device may include two sheets of display panels. A liquid crystal display may include a lower panel including a thin film transistor and an upper panel facing the lower panel, and an organic light emitting device may include a lower panel including a thin film transistor and an emission layer and an upper panel facing the lower panel.

SUMMARY

Embodiments may be realized by providing a display device, including a color conversion film, including a base film including a plurality of openings, the base film blocking light, and a color conversion layer in the openings, the color conversion layer including a pattern of different colors.

The base film may be a black film.

The black film may be a black polyester film including carbon black.

The color conversion layer may include three different colors sequentially disposed in different openings.

The color conversion layer may include a red filter, a green filter, and a blue filter.

The color conversion layer may include an emission layer.

The display device may further include a reflection layer on sides of the openings.

The reflection layer may include a metal for reflecting the light.

Embodiments may be realized by providing a method for manufacturing a display device, the method including manufacturing a color conversion film, including providing a base film for blocking light, forming a plurality of openings in the base film, and forming a color conversion layer in the openings.

The base film may be a black film.

The black film may be a black polyester film including carbon black.

The color conversion layer may include three different colors sequentially disposed in different openings.

The color conversion layer may include a red filter, a green filter, and a blue filter.

The method may further include forming a reflection layer on sides of the openings after forming the plurality of openings.

The color conversion layer may include a phosphorous material.

The reflection layer may include a metal for reflecting the light.

Embodiments may be realized by providing a color conversion film, including a base film including a plurality of openings, the base film blocking light; and a color conversion layer in the openings, the color conversion layer including a pattern of different colors.

Embodiments may be realized by providing a method for manufacturing a color conversion film, the method including providing a base film for blocking light; pattern-forming a plurality of openings in the base film; and pattern-forming a color conversion layer in the openings.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
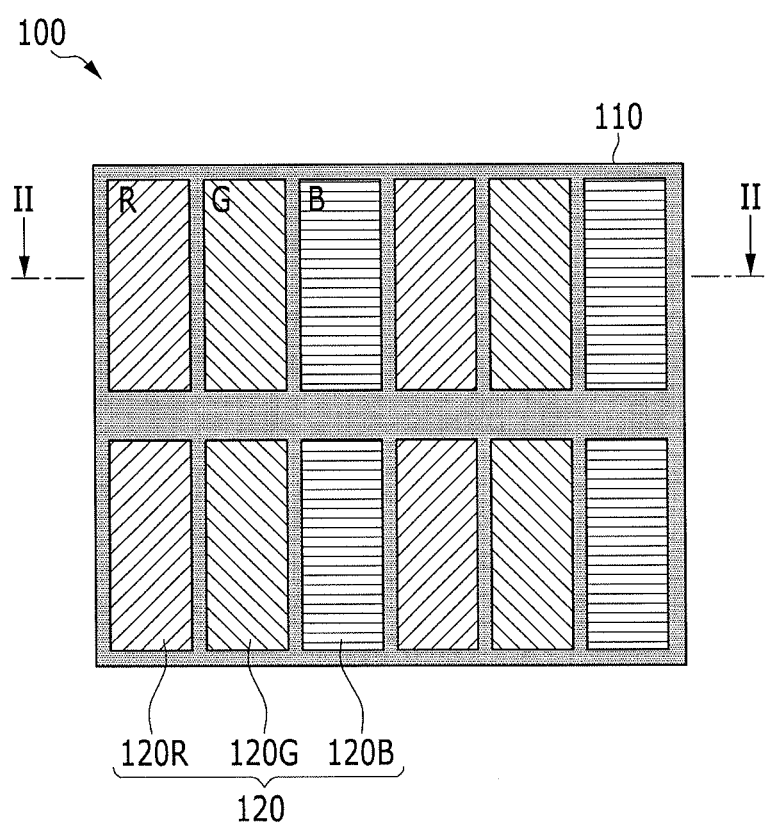
FIG. 1 illustrates a top plan view of a color conversion film according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawings, the thickness of layers, films, panels, regions, etc., may be exaggerated for clarity. It will be understood that when an element such as a layer, film, region, or substrate is referred to as being "on" another element, it can be directly on the other element or intervening elements may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals designate like elements throughout the specification.

Exemplary embodiments will now be described in detail with reference to accompanying drawings.

Figure 2:
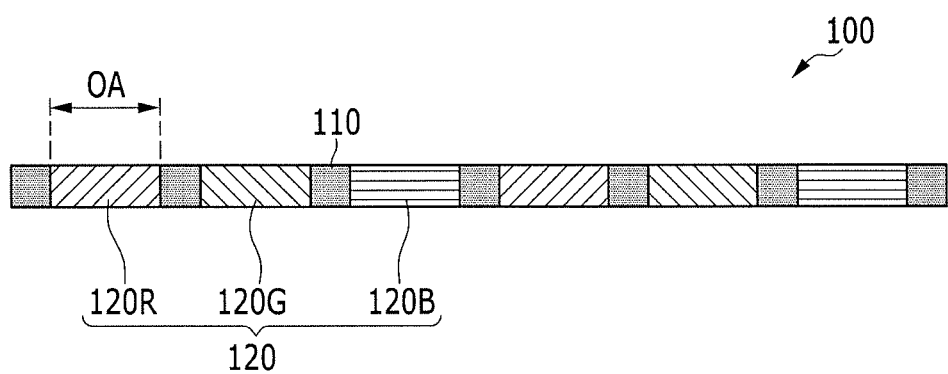
FIG. 2 illustrates a cross-sectional view of a color conversion film according to an exemplary embodiment.

FIG. 1 illustrates a top plan view of a color conversion film according to an exemplary embodiment, and FIG. 2 illustrates a cross-sectional view of a color conversion film according to an exemplary embodiment with respect to a line II-II of FIG. 1.

Referring to FIG. 1 and FIG. 2, the color conversion film 100 may include a base film 110 and a color conversion layer 120.

The base film 110 may include a plurality of openings (OA), and the color conversion layer 120 may be provided in the openings (OA).

A black-based film, e.g., a black film, formed with a black-based color, e.g., black, for blocking light may be used for the base film 110. For example, the black-based film may be a black polyester film including carbon black or a black polyurethane film. In an embodiment, a film that may block light and that may have an excellent thermal characteristic and combustibility may be used.

The color conversion layer 120 may be provided in the openings (OA), and may correspond to a pixel area of the display device. A region other than the openings (OA) may represent a region in which the base film 110 may be provided, which may block light, and which may correspond to a region in which a thin film transistor of the display device may be provided or a region in which wires connected to the thin film transistor may be provided.

The color conversion layer 120 may include a color filter. The color filter 120 may include a red color filter 120R, a green color filter 120G, and a blue color filter 120B that are different from each other, and that may be sequentially disposed in the openings (OA). The red color filter 120R, the green color filter 120G, and the blue color filter 120B may be provided to correspond to a red sub-pixel area, a green sub-pixel area, and a blue sub-pixel area. Each sub-pixel area including the red, green, and blue color filters 120R, 120G, and 120B may configure a pixel and may display colors.

As described, the base film 110 may be formed with a material for blocking light to reduce an additional black matrix process and production cost, the base film 110 for blocking light and the color conversion layer 120 may be disposed on the same layer, and the color conversion film 100 according to an exemplary embodiment may be formed to be thin.

Figure 3:
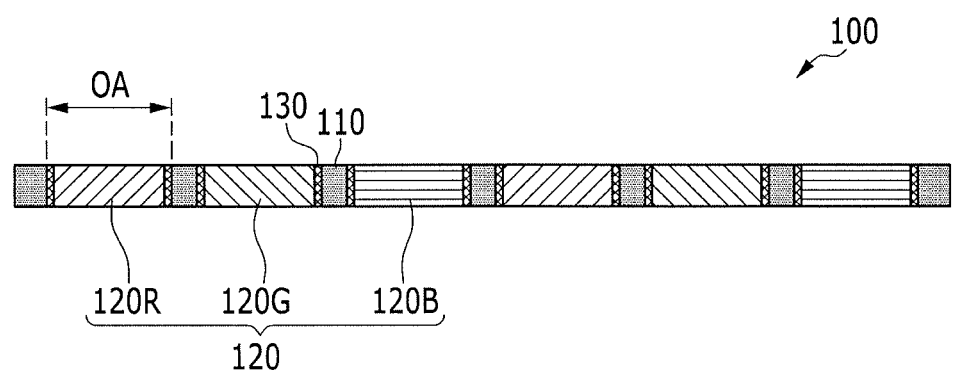
FIG. 3 illustrates a cross-sectional view of a color conversion film according to an exemplary embodiment.

FIG. 3 illustrates a cross-sectional view of a color conversion film according to an exemplary embodiment, which corresponds to the color conversion film described with reference to FIG. 1 and FIG. 2 except that the material of the color conversion layer 120 is changed and a reflection layer 130 is added. Like constitutional elements will have like reference numerals, and no repeated descriptions thereof will be provided.

Referring to FIG. 3, the color conversion film 100 according to an exemplary embodiment may include a base film 110, a color conversion layer 120, and a reflection layer 130.

The base film 110 may include a plurality of openings (OAs) in which the color conversion layer 120 may be provided.

The color conversion layer 120 may include an emission layer for emitting light in all directions.

The emission layer may be formed with a resin layer having a quantum dot phosphorous material for changing a wavelength of the incident light and emitting light in every direction. A plurality of quantum dots for selectively converting light in a specific wavelength band may be dispersed on the resin layer to change the light into red wavelength band light, green wavelength band light, and blue wavelength band light.

For example, the color conversion layer 120 may include a red color conversion layer 120R, a green color conversion layer 120G, and a blue transmission layer 120B. The red color conversion layer 120R for converting the blue light supplied by a light source into red may include a cyanine-based pigment such as 4-dicyanomethylene-2-methyl-6-(p-dimethylaminostylelil)-4H-pyran (DCM), a pyridine-based pigment such as 1-ethyl-2-(4-(p-dimethylaminophenyl)-1,3-butadienyl)-pyridinium perchlorate(pyridine), a rhodamine-based pigment such as rhodamine B, rhodamine 6G, or basic biored 11, or an oxadin-based pigment.

The green color conversion layer 120B for converting the blue light supplied by the light source into green may include a coumarin pigment such as 2,3,5,6-1H,4H-tetrahydro-8-triprol methyl kinoridino (9,9a, 1-gh)coumarin (coumarin153), 3-(2'-benzo thiazolyl)-7-diethylaminocoumarin coumarin6, and 3-(2'-benz imidazolyl)-7-N,N-diethylaminocoumarin coumarin7, or a naphthalimide pigment such as basic yellow-51, solvent yellow-11, or solvent yellow-116 that are coumarin pigment-based dyes.

The blue transmission layer 120B may be a transparent transmission layer without any colors, may be formed with a transparent resin without colors, or no other material may be formed thereon.

The blue transmission layer 120B may allow the blue light to be passed through without a loss of light and increase blue luminance. No material may be formed on the blue transmission layer 120B, an additional manufacturing process for forming the blue transmission layer 120B may be not performed, and the production process may be simplified and the production cost may be reduced.

A reflection layer 130 may be provided on a side of the opening (OA) of the base film 110. The reflection layer 130 may be formed with a metal material, e.g., may include a metal, for reflecting light. The reflection layer 130 may increase photo-efficiency by reflecting the light emitting in the lateral direction of the opening (OA) of the base film 110 from the color conversion layer 120 instead of absorbing the light.

Hereinafter, no repeated descriptions of materials and configurations of the respective constitutional elements will be provided.

A method for manufacturing a color conversion film according to an exemplary embodiment will now be described with reference to FIG. 4 to FIG. 7D.

Figure 4:
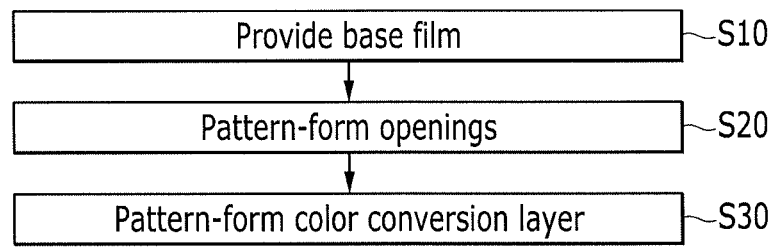
FIG. 4 illustrates a flowchart for manufacturing a color conversion film according to an exemplary embodiment.

FIG. 4 illustrates a flowchart for manufacturing a color conversion film according to an exemplary embodiment and FIG. 5A to FIG. 7D illustrate processing diagrams for manufacturing a color conversion film according to an exemplary embodiment.

Referring to FIG. 4, a method for manufacturing a color conversion film according to an exemplary embodiment may include: providing a base film for blocking the light S10; pattern-forming a plurality of openings in the base film S20, e.g., forming a plurality of openings in the base film S20 in a pattern; and pattern-forming a color conversion layer in the openings S30, e.g., forming a color conversion layer in the openings in a pattern.

For example, a plurality of openings are pattern-formed, e.g., formed in a pattern, in the base film, a red color conversion layer may be formed in the openings, a plurality of openings are pattern-formed in the base film, a green color conversion layer may be formed in the openings, a plurality of openings are pattern-formed in the base film, and a blue color conversion layer may be formed in the openings. "Pattern-formed" means that openings or a color conversion is formed at regular intervals.

A method for pattern-forming a red color conversion layer 120R will now be described with reference to FIG. 5A to FIG. 5E.

Figure 5A:
FIG. 5A to FIG. 7D illustrate processing diagrams for manufacturing a color conversion film according to an exemplary embodiment.

A base film 110 for blocking light may be provided (FIG. 5A). The base film 110 may use a black-based film for preventing light leakage.

Figure 5B:
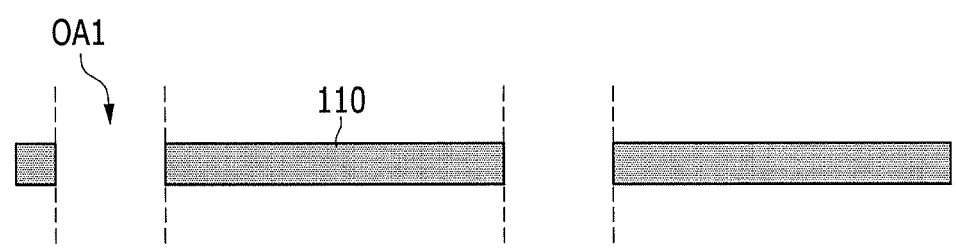
Figure 5C:
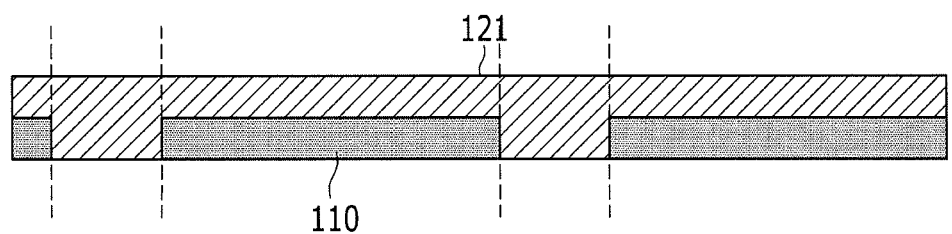

A plurality of first openings (OA1) are pattern-formed in the base film 110 (FIG. 5B).

A first opening OA1 corresponding to the red sub-pixel area may be pattern-formed by using a micro-drilling device.

Figure 5D:
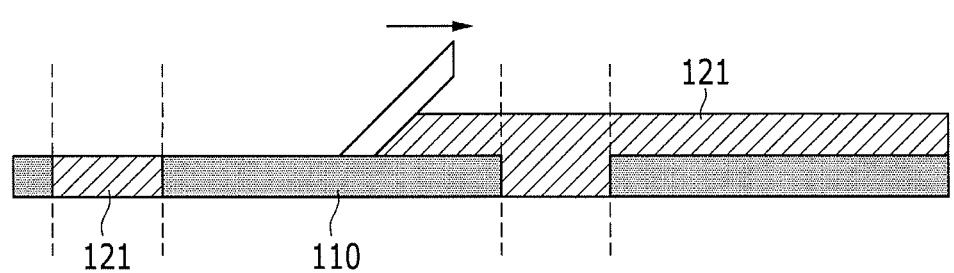
Figure 5E:
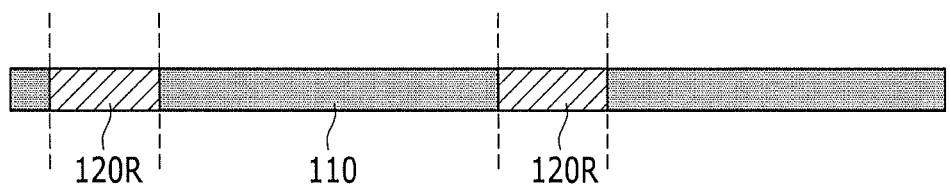

A red photoresist 121 may be coated on the base film 110 (FIG. 5C), the red photoresist 121 disposed in the first opening OA1 may be allowed to remain, e.g., may be retained, and the red photoresist 121 remaining on the base film 110 may be removed (FIG. 5D). The red photoresist 121 disposed in the first opening OA1 may be UV-cured or heat-cured to form a red color conversion layer 120R (FIG. 5E).

A method for pattern-forming a green color conversion layer 120G will now be described with reference to FIG. 6A to FIG. 6D.

Figure 6A:
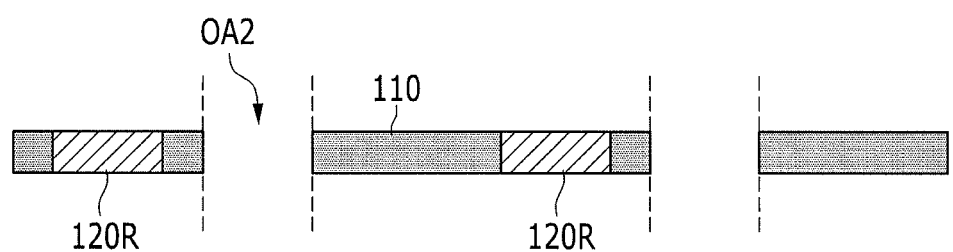
Figure 6B:
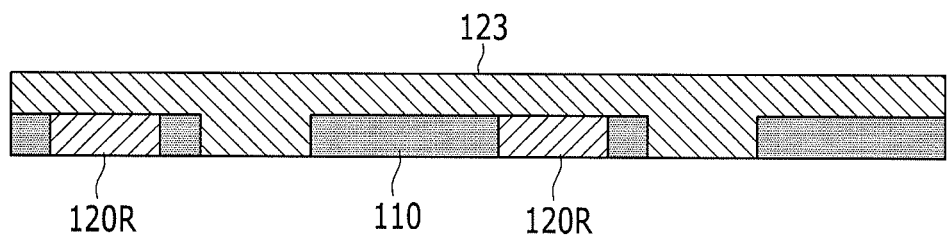

A second opening OA2 corresponding to the green sub-pixel area may be pattern-formed in the base film 110 by using the micro-drilling device (FIG. 6A).

Figure 6C:
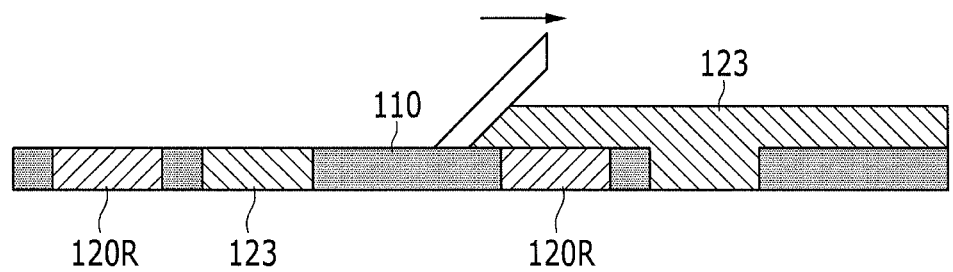
Figure 6D:
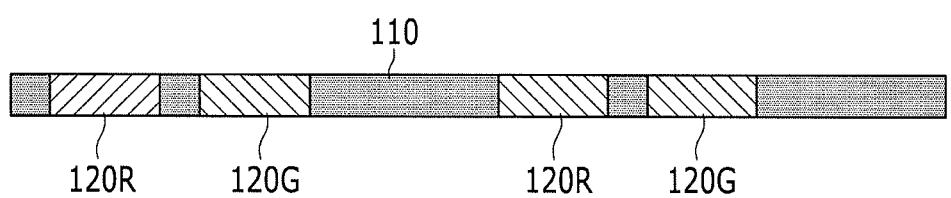

A green photoresist 123 may be coated on the base film 110 (FIG. 6B), the green photoresist 123 disposed in the second opening OA2 may be retained, and the green photoresist 123 remaining on the base film 110 may be removed (FIG. 6C). The green photoresist 123 disposed in the second opening OA2 may be UV-cured or heat-cured to form the green color conversion layer 120G (FIG. 6D).

A method for pattern-forming a blue color conversion layer 120B will now be described with reference to FIG. 7A to FIG. 7D.

Figure 7A:
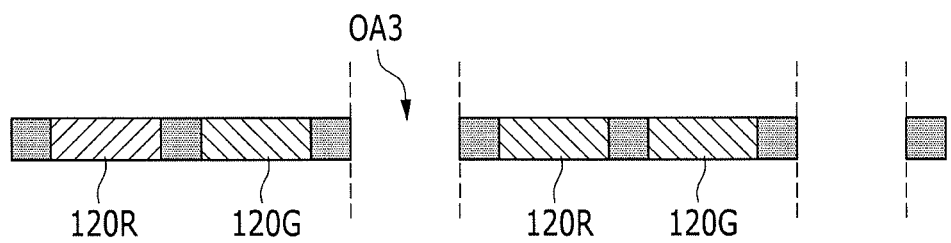
Figure 7B:
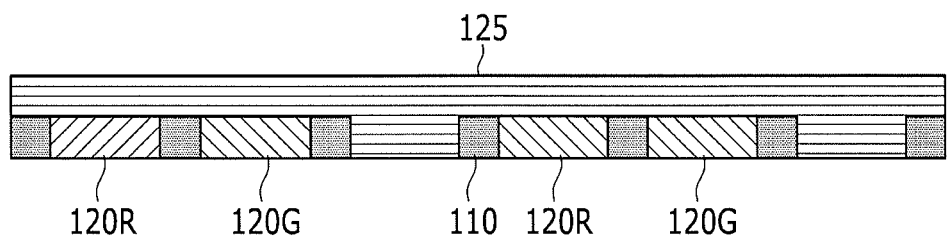

A third opening OA3 corresponding to the blue sub-pixel area may be pattern-formed in the base film 110 by using the micro-drilling device (FIG. 7A).

Figure 7C:
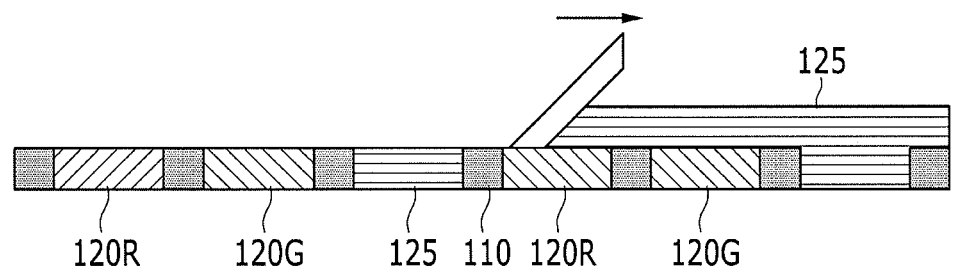
Figure 7D:
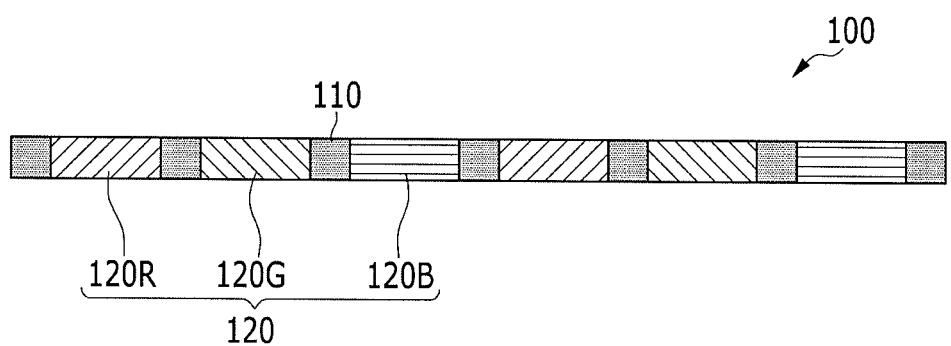

A blue photoresist 125 may be coated on the base film 110 (FIG. 7B), the blue photoresist 125 disposed in the third opening OA3 may be retained, and the blue photoresist 125 remaining on the base film 110 may be removed (FIG. 7C). The blue photoresist 125 disposed in the third opening OA3 may be UV-cured or heat-cured to form a blue color conversion layer 120R (FIG. 7D).

The method for forming the color conversion layer 120 may be a screen printing method or an ink-jet method in addition to the method for performing heat curing after coating a photoresist.

The method for manufacturing a color conversion film 100 according to an exemplary embodiment may allow the base film 110 to use the black-based film for blocking light, no additional process for forming a black matrix may be needed, the process may be simplified, and a uniform pattern may be formed.

A method for manufacturing a color conversion film according to an exemplary embodiment will now be described with reference to FIG. 8A to FIG. 8G.

FIG. 8A to FIG. 8G illustrate processing diagrams for manufacturing a color conversion film according to an exemplary embodiment, which corresponds to the method for manufacturing a color conversion film described with reference to FIG. 4 to FIG. 7D except that the material for forming the color conversion layer is changed and a reflection layer is added. Like constitutional elements will have like reference numerals, a process for manufacturing a red color conversion layer will be described, and a method for manufacturing a green color conversion layer and a blue color conversion layer will not be described because the green color conversion layer and the blue color conversion layer may be manufactured in a like manner of the method for manufacturing the red color conversion layer.

A base film 110 for blocking light may be provided (FIG. 8A), and a first opening OA1 corresponding to the red sub-pixel area may be pattern-formed on the base film 110 by using the micro-drilling device.

Figure 8A:
FIG. 8A to FIG. 8G illustrate processing diagrams for manufacturing a color conversion film according to an exemplary embodiment.
Figure 8B:
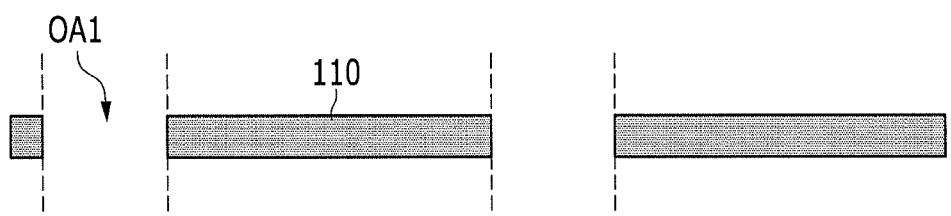
Figure 8C:
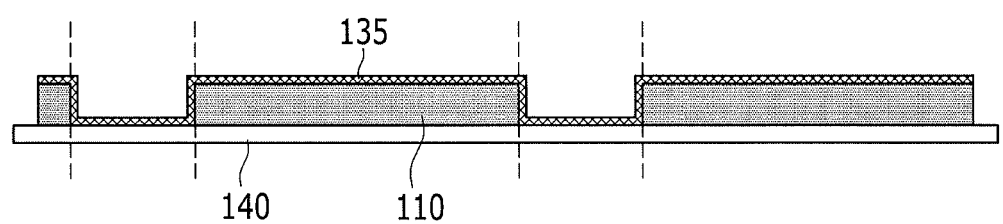

The base film 110 having the first opening OA1 may be disposed on a substrate 140, and a metal material 135 may be coated on the base film 110 (FIG. 8C).

Figure 8D:
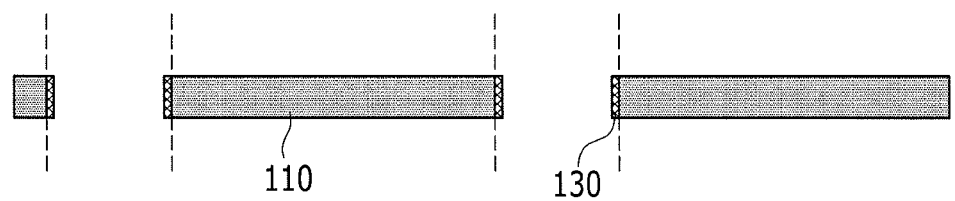
Figure 8E:
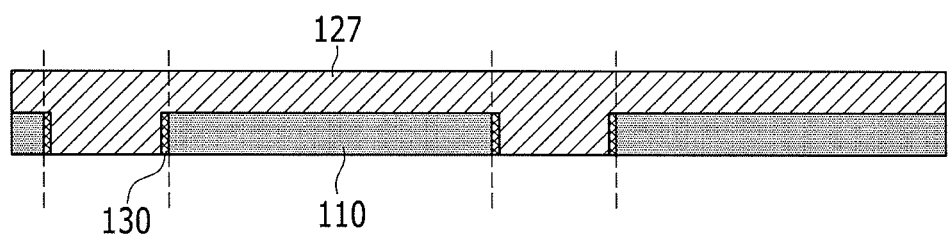
Figure 8F:
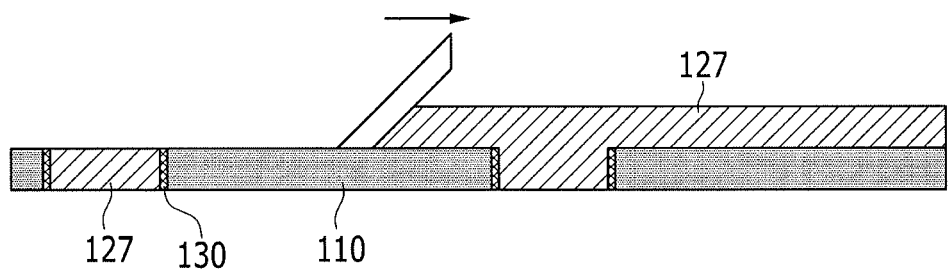

The substrate 140 may be removed, the metal material 135 may remain on the side of the first opening OA1, and the metal material 135 remaining on the base film 110 may be removed to form a reflection layer 130 (FIG. 8D).

A red color conversion layer 120R may be pattern-formed in the first opening OA1.

Figure 8G:
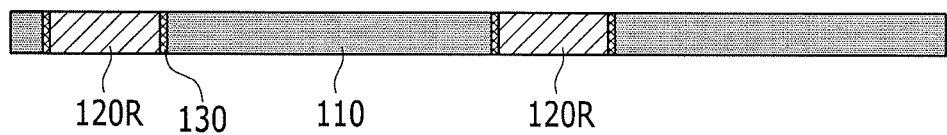

A quantum dot phosphor material 127 for changing a wavelength of the incident light into red and emitting light in every direction may be coated on the base film 110 (FIG. 8E), the phosphor material 127 remaining on the base film 110 may be removed (FIG. 8F), and the phosphor material 127 may be UV-cured or heat-cured to form a red color conversion layer 120R (FIG. 8G).

As described, the method for manufacturing a color conversion film 100 according to an exemplary embodiment may form the color conversion layer with a phosphorous material and may form the reflection layer on a side of the opening, light emitting in the direction of the side of the opening of the base film may not be absorbed, and may be reflected to increase photo-efficiency.

Figure 9:
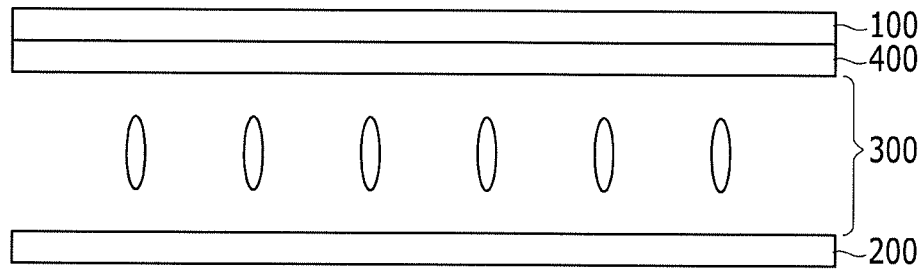
FIG. 9 illustrates a cross-sectional view of a liquid crystal display according to an exemplary embodiment.

FIG. 9 illustrates a cross-sectional view of a liquid crystal display according to an exemplary embodiment, relating to the liquid crystal display to which the color conversion film described with reference to FIG. 1 to FIG. 3 may be applied.

Referring to FIG. 9, the liquid crystal display according to an exemplary embodiment may include a lower panel 200 including a thin film transistor; an upper panel 400 facing the lower panel 200, a liquid crystal layer 300 formed between the respective display panels, and a color conversion film 100 provided on the upper panel 400.

The lower panel 200 may include a pixel electrode connected to the thin film transistor, and a common electrode for forming an electric field for driving liquid crystal together with the pixel electrode may be additionally formed on the upper panel 400.

The liquid crystal display according to an embodiment may be applied to liquid crystal displays with various kinds of modes, such as a twisted nematic (TN) mode, a vertical alignment (VA) mode, or an in-plane switching (IPS) mode.

The color conversion film 100 may be formed with a black-based film for preventing leakage of light to other areas except the pixel area, and the color conversion film 100 may include a color conversion layer in the area that corresponds to the pixel area.

The color conversion film 100 has been described to be provided on the upper panel 400, and the color conversion film 100 may also be formed to be provided on the lower panel 200.

Regarding the liquid crystal display described with reference to FIG. 9, the method for manufacturing a liquid crystal display to which the method for manufacturing a color conversion film according to FIG. 4 to FIG. 8 may be applied is provided.

Figure 10:
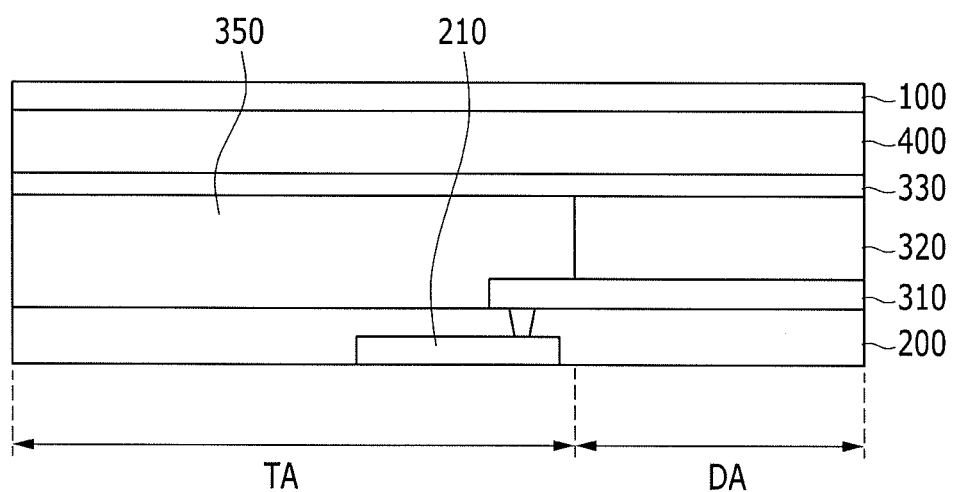
FIG. 10 illustrates a cross-sectional view of an organic light emitting device according to an exemplary embodiment.

FIG. 10 illustrates a cross-sectional view of an organic light emitting device according to an exemplary embodiment, relating to an organic light emitting device to which the color conversion film described with reference to FIG. 1 to FIG. 3 may be applied.

Referring to FIG. 10, the organic light emitting device according to an exemplary embodiment may include a lower panel 200 including a thin film transistor 210, a pixel electrode 310, an emission layer 320, a common electrode 330, a bank layer 350, an upper panel 400, and a color conversion film 100 provided on the upper panel 400.

The pixel electrode 310 may be connected to the thin film transistor 210 included in the lower panel 200.

The bank layer 350 may be formed in a transistor area (TA) on the lower panel 200, and a pixel area (DA) for displaying an image may be surrounded by the bank layer 350.

The emission layer 320 may be formed on the pixel electrode 310. The emission layer 320 may be formed by sequentially stacking a hole injection layer, a hole transfer layer, an organic emission layer, an electron transfer layer, and an electron injection layer. One or two of the hole injection layer, the hole transfer layer, the electron transfer layer, and the electron injection layer may be omitted. The emission layer 320 may be modifiable in various ways in addition to the combination of the above-noted layers.

The common electrode 330 may be formed on the emission layer 320. The common electrode 330 may be formed on a side of the upper panel 400 including the bank layer 350 as well as the emission layer 320.

The common electrode 330 may be formed of, for example, metal such as silver (Ag).

The color conversion film 100 may be provided on the upper panel 400.

The color conversion film 100 may be formed with a black-based film for blocking the leakage of light into the thin film transistor area (TA), and may include a color conversion layer in an area corresponding to the pixel area (DA).

The color conversion film 100 has been described to be provided on the upper panel 400, and the color conversion film 100 may be formed to be provided on the lower panel 200.

Regarding the organic light emitting device described with reference to FIG. 10, the method for manufacturing a liquid crystal display to which the method for manufacturing a color conversion film according to FIG. 4 to FIG. 8 may be applied is provided.

By way of summation and review, a color filter may be formed on a display panel and may include a red color filter, a green color filter, and a blue color filter depending on colors that are filtered from white light.

The color filter may be formed on a substrate and may form a color filter array panel. The color filter may be manufactured on the substrate according to a photolithography method using a photoresist. A polymer photoresist layer mixed with a black matrix material may be coated on the substrate, a black matrix pattern may be formed by an exposure and development process, a polymer photoresist layer mixed with a red pigment may be coated on the substrate, a pattern of a red region may be formed by an exposure and development process, and a pattern of a green region and a pattern of a blue region may be formed by using the same method and process, and the color filter of three primary colors including red, green, and blue that may be arranged according to a predetermined rule may be formed.

While the photolithography process may precisely provide a desired pattern, the process may require many stages and many materials to maximize the effect of the photoresist.

Provided is a display device that may require no substrate, simplifying a process, and may form a uniform pattern, a color conversion film, and a manufacturing method thereof.

According to a color conversion film according to embodiments, the base film may be formed with a material for blocking the light to reduce an additional black matrix process and reduce production cost, and the base film and the color conversion layer may be disposed on the same layer and may be made thin.

The color conversion film according to embodiments may form the color conversion layer with a phosphorous material and may form the reflection layer on a side of the opening, and light emitting in the direction of the side of the opening of the base film may not be absorbed, and may be reflected to increase photo-efficiency.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method for manufacturing a display device, the method comprising:
   manufacturing a color conversion film, including:
      providing a base film for blocking light,
      forming a plurality of first openings in the base film,
      forming a first color conversion layer in the first openings,
      forming a plurality of second openings in the base film after forming the first color conversion layer in the first openings, and
      forming a second color conversion layer in the second openings, the second color conversion layer including a different color than the first color conversion layer.

2. The method as claimed in claim 1, wherein the base film is a black film.

3. The method as claimed in claim 2, wherein the black film is a black polyester film including carbon black.

4. The method as claimed in claim 1, wherein the color conversion layer includes three different colors sequentially disposed in different openings.

5. The method as claimed in claim 4, wherein the color conversion layer includes a red filter, a green filter, and a blue filter.

6. The method as claimed in claim 1, further comprising:
   forming a first reflection layer in the first openings on sidewalls of the first openings after forming the plurality of first openings and before forming the first color conversion layer in the first openings, and
   forming a second reflection layer in the second openings on sidewalls of the second openings after forming the plurality of second openings and before forming the second color conversion layer in the second openings.

7. The method as claimed in claim 6, wherein the color conversion layer includes a phosphorous material.

8. The method as claimed in claim 6, wherein the reflection layer includes a metal for reflecting the light.

9. The method as claimed in claim 1, wherein manufacturing the color conversion film further includes:

forming a plurality of third openings in the base film after forming the second color conversion layer in the second openings, and forming a third color conversion layer in the third openings, the third color conversion layer including a different color than the first color conversion layer and the second color conversion layer.

10. A method for manufacturing a color conversion film, the method comprising:

providing a base film for blocking light;

pattern-forming a plurality of first openings in the base film;

pattern-forming a first color conversion layer in the first openings;

pattern-forming a plurality of second openings in the base film after pattern-forming the first color conversion layer in the first openings; and pattern-forming a second color conversion layer in the second openings, the second color conversion layer including a different color than the first color conversion layer.

11. The method as claimed in claim 10, further comprising:

pattern-forming a plurality of third openings in the base film after pattern-forming the second color conversion layer in the second openings; and pattern-forming a third color conversion layer in the third openings, the third color conversion layer including a different color than the first color conversion layer and the second color conversion layer.

12. The method as claimed in claim 10, further comprising:

forming a first reflection layer in the first openings on sidewalls of the first openings after pattern-forming the plurality of first openings and before pattern-forming the first color conversion layer in the first openings, and forming a second reflection layer in the second openings on sidewalls of the second openings after pattern-forming the plurality of second openings and before pattern-forming the second color conversion layer in the second openings.

* * * * *